United States Patent
Labidi Bouchrika et al.

(10) Patent No.: US 12,219,957 B2
(45) Date of Patent: Feb. 11, 2025

(54) PRESERVATIVE COMPOSITION FOR WOOD BASED ON MODIFIED LIGNIN

(71) Applicant: UNIVERSIDAD DEL PAÍS VASCO / EUSKAL HERRIKO UNIBERTSITATEA, Leioa (ES)

(72) Inventors: Jalel Labidi Bouchrika, Leioa (ES); Darci Alberto Gatto, Centro Brazil (BR); Patricia Bihalva Soares Dos Santos, Altamira/PA (BR)

(73) Assignee: UNIVERSIDAD DEL PAÍS VASCO / EUSKAL HERRIKO UNIBERTSITATEA, Leioa (ES)

( * ) Notice: Subject to any disclaimer, the term of this patent is extended or adjusted under 35 U.S.C. 154(b) by 943 days.

(21) Appl. No.: 17/253,318

(22) PCT Filed: Jun. 21, 2019

(86) PCT No.: PCT/EP2019/066459
§ 371 (c)(1),
(2) Date: Dec. 17, 2020

(87) PCT Pub. No.: WO2019/243569
PCT Pub. Date: Dec. 26, 2019

(65) Prior Publication Data
US 2021/0251222 A1     Aug. 19, 2021

(30) Foreign Application Priority Data

Jun. 21, 2018   (ES) .................... ES201830613

(51) Int. Cl.
*A01N 31/16*   (2006.01)
*B27K 3/02*    (2006.01)
(Continued)

(52) U.S. Cl.
CPC ............ *A01N 31/16* (2013.01); *B27K 3/0207* (2013.01); *B27K 3/153* (2013.01); *B27K 3/163* (2013.01);
(Continued)

(58) Field of Classification Search
CPC ...... A01N 31/16; B27K 3/0207; B27K 3/153; B27K 3/163; B27K 3/20; B27K 3/22;
(Continued)

(56) References Cited

U.S. PATENT DOCUMENTS 5,246,739 A     9/1993  Lin
2004/0258768 A1* 12/2004  Richardson ............ A01N 59/20
                                                    424/630

(Continued)

FOREIGN PATENT DOCUMENTS

| EP | 0197908 A1 | 10/1986 |
| EP | 1034903 A1 | 9/2000 |
| WO | 2015105751 A1 | 7/2015 |

OTHER PUBLICATIONS

International Search Report issued Nov. 4, 2019 re: Application No. PCT/EP2019/066459, pp. 1-4, citing: Patricia Santos et al. "Study of the use of organosolv . . . ", EP 0 197 908 A1, U.S. Pat. No. 5,246,739 A, WO 2015/105751 A1 and EP 1 034 903 A1.

(Continued)

*Primary Examiner* — David T Karst
(74) *Attorney, Agent, or Firm* — CANTOR COLBURN LLP (57) ABSTRACT

A method for preparing a wood preservative composition, includes modifying lignin with $Na_2B_4O_7$ or $NaNO_3$ and then with a chromium (II) salt, copper (II), cadmium (II) or zinc (II), for example, metal nitrates ($Cr(NO_3)_2$, $Cu(NO_3)_2$, $Cd(NO_3)_2$, $Zn(NO_3)_2$); to the preservative obtainable by this method; and to a method for preserving wood; and to the (Continued)

Cylinder used to impregnate the wood.

preserved wood. The preservative prevents degradation by xylophagous and fungal agents, and also improves some properties of the wood, and the hygroscopicity and fire resistance.

8 Claims, 10 Drawing Sheets

(51) Int. Cl.
*B27K 3/15* (2006.01)
*B27K 3/16* (2006.01)
*B27K 3/20* (2006.01)
*B27K 3/22* (2006.01)
*B27K 3/26* (2006.01)
*B27K 3/52* (2006.01)
*C08L 97/00* (2006.01)

(52) U.S. Cl.
CPC .................. *B27K 3/20* (2013.01); *B27K 3/22* (2013.01); *B27K 3/26* (2013.01); *B27K 3/52* (2013.01); *C08L 97/005* (2013.01); *B27K 2240/20* (2013.01); *B27K 2240/30* (2013.01); *B27K 2240/70* (2013.01)

(58) Field of Classification Search
CPC ........ B27K 3/26; B27K 3/52; B27K 2240/20; B27K 2240/30; B27K 2240/70; C08L 97/005

USPC ......................................................... 530/500
See application file for complete search history.

(56) References Cited

U.S. PATENT DOCUMENTS

2007/0151476 A1 7/2007 Humar et al.
2008/0063884 A1* 3/2008 Robinson .................. B27K 3/52
   427/372.2
2015/0189870 A1* 7/2015 Lake ........................ B27K 3/08
   427/393

OTHER PUBLICATIONS

Patricia Santos et al. "Study of the use of organosolv lignin as bio-preservative of wood", May 22, 2018, pp. 2-12, Retrieved from the Internet: URL:https://www.researchgate.net/publication/232797606_Study_of_the_use_of_organosolv_lignin_as_bio-preservative_of_wood; XP055634680.
Written Opinion issued Nov. 4, 2019 re: Application No. PCT/EP2019/066459, pp. 1-6, citing: Patricia Santos et al. "Study of the use of organosolv . . . ", EP 0 197 908 A1, U.S. Pat. No. 5,246,739 A, WO 2015/105751 A1 and EP 1 034 903 A1.

* cited by examiner

Figure 1. Cylinder used to impregnate the wood.

Figure 2. Behaviour of the contact angle as a function of the time for the Pinus spp. wood samples treated with the different treatments according to the invention, in longitudinal tangential sections.

Figure 3. Behaviour of the sessile drop as a function of the time for the Pinus spp. wood samples treated with the different treatments in the longitudinal tangential section.

Figure 4. Effect of the different lignin treatments on the results observed for the hardness of the samples.

Figure 5. Behaviour of the wood samples treated with the different treatments for the adhesion resistance.

Figure 6. Behaviour of the wood samples treated with the different treatments for fire resistance from direct exposure.

Figure 7. Behaviour of the wood samples treated with the different treatments for fire resistance from exposure for 2 minutes.

Figure 8. Installation of the degradation field in a eucalyptus forest.

Figure 9. Behaviour of the *Pinus* spp. wood samples with the different treatments present in the invention exposed to accelerated aging in a weathering chamber.

Figure 10. Retention of the woods treated with the different treatments present in the invention.

PRESERVATIVE COMPOSITION FOR WOOD BASED ON MODIFIED LIGNIN

TECHNICAL FIELD

The present disclosure relates to a preservative composition for wood based on modified lignin according to the disclosure, with the aim of protecting the wood from xylophagous and fungal agents, and to improve some properties of the same, such as the hygroscopicity and fire resistance.

BACKGROUND

With the aim of protecting the environment, attempts are currently being made to develop processes and cleaner technologies for the production of products that pollute less, and to make rational use of resources, by reusing waste and minimizing the use of materials. For this reason, the treatments that increase the useful life of the wood are extremely important for the environment, with the aim of preventing, to some extent, deforestation. Throughout its useful life, wood may undergo degradation due to the action of xylophagous agents, which varies according to the species and the environmental conditions of use.

The wood is exposed to various degradation factors, both biotic and abiotic. These processes are necessary in nature to replenish nutrients in the soil, but when they are used for the purposes of construction or furniture, it is advisable to slow down these degradation processes as much as possible. Therefore, the wood used by the forestry and timber sectors, in industries providing products with higher added value, has a series of limitations in its applications, both outdoors and indoors, especially in the absence of preservative treatments (for example CCA, chromated copper arsenate). This unfavorable effect means that the wood is often substituted for alternative materials, which is not always cheaper or of better quality. Nevertheless, wood is a renewable material, widely consumed throughout the world, thus having the need to use methods which add commercial value of the wood, preventing restrictions in certain uses. Therefore, the treated or preserved wood increases its useful life, and consequently, the consumption and waste of wood is reduced and the process of deforestation decreases.

Chemical protection of the wood is carried out, among others, by means of biocides containing preservatives of the wood. They are applied or introduced into the wood with the aim of forming a barrier against the action of the putrid fungi and insects.

It should be highlighted that some treatments containing arsenic are currently banned, such as CCA (chromated copper arsenate), among those that are most widely used throughout the world, which is a water soluble preservative, with a fungicide and insecticide function. Due to the potential environmental risk with the use of preservatives containing arsenic, these components are classified as hazardous waste in the European Union.

In the protection of wood, the use of metals such as copper and chromium has been known for many years. Copper is effective at protecting the wood, especially against the action of fungi, and its use is relatively safe in comparison to other types of preservatives, e.g. organic preservatives. Nevertheless, copper has a significant drawback: it does not remain fixed to the wood, and therefore has the tendency to lixiviate towards the exterior; however, with the combination of copper and chromium, this problem was resolved. Chromium IV is known for its carcinogenic nature, for which reason, its use is banned in many applications, while chromium (III) is considered an essential nutrient for humans.

There are also other non-metallic preservatives available, such as disodium octaborate and other borates (SBX), organic biocides/pesticides such as: triazoles, synthetic pyrethroids, chlorothalonil quats, didecyldimethylammonium chloride (DDAC) and isothiazolone and 4,5-dichloro-2-octyl-4-isothiazolin-3-one (DCOIT); or metallic and non-metallic preservative combinations, such as for example the composition described in document US2007/0151476A1. Although the incorporation of carboxylic acids with 6 or more carbon atoms seems to improve the fixation of copper to the wood, somewhat reducing the lixiviation of the copper, in a similar extent to the compositions of copper and chromium previously mentioned, this problem is not completely eliminated.

In light of these reasons, it is necessary to develop new preservative products for wood which overcome the mentioned problems, taking into account environmental considerations and minimizing the noxious effects on humans. In this context, the use of lignin, which is an abundant polymer naturally present in plants and trees and which has bioprotective activity, in other words, a natural protector of the plant against the attack of microorganisms and pests, is profiled as a good option to provide a novel biopreservative, which is effective and environmentally safe.

The use of plant biomass as the basic primary material, involves the change from an economy based on the exploitation of fossil and non-renewable fuels, with limited reserves, to a bioeconomy based on the utilization of renewable, organic natural resources, with balanced regeneration and extraction cycles.

The lignin with number CAS 9005-53-2 is a macromolecule complex in relation to its structure and heterogeneity. For this reason, it is not possible to describe a defined structure of the lignin; however, numerous models representing its structure have been proposed. Nevertheless, it is known that it forms part of the cell wall of plants, acts like a cement between the cells and protecting the cellulose fibers, conferring on them improved mechanical properties, giving elasticity and resistance to the material. It is mainly concentrated in the middle lamella. It is an amorphous three-dimensional molecule formed by units of oxygenated phenylpropene, binded by C—C bonds or ether-type bonds. The precursors of the lignin, which can be formed from D-glucose, are p-hydroxyphenyl propane (H), Guaiacol (G) and syringyl alcohol (S), which, by means of complex reactions, result in coniferyl, synapylic and paracoumaryl alcohols, which is the reason why the lignin exhibits an increased molecular weight, which results in the bonding of various acids and phenylpropyl alcohols. The random coupling of these radicals gives rise to the three-dimensional amorphous structure, characteristic of the lignin.

The structural base of the lignin is the phenylpropene, a variable number of hydroxylic and metoxylic groups having bonded to the benzenic ring. The metoxylic groups ($—OCH_3$) are the most characteristic functional group of the lignin and around 90% of the metoxylic groups of wood are lignin.

The hydroxylic groups (OH) present in the lignins represent around 10% of its weight (1.1/unit of phenylpropene) for coniferous trees. These groups are generally of a phenolic or alcoholic nature (primary, secondary and tertiary alcohols).

Other functional groups are present in the lignin among which stand out the carboxylic groups (COOH) around 0.05/unit of phenylpropene and carboxylic groups (CO), 0.1% to 0.2/unit of phenylpropene.

Although the structure of the lignin is complex and variable, it is easily achieved in a commercial manner. But it is known that there are differences between the lignin in its natural state and the lignin which is isolated by different methods. Due to its complex structure, during its isolation from the cell walls, the lignin undergoes structural modifications, which prevents the lignin from being obtained exactly as in plants, since, once the lignin is isolated from its bond with the cell wall, a breakage of the ligations of the lignin is produced with the polysaccharides and a reduction of the molecular weight.

There are different methods for isolating the lignin, but only two types of commercially available lignin: sulfonated lignins and Kraft lignins. In the present disclosure, the Kraft and Organosolv method are used.

The process known as "Organosolv" is a process in which organic solvents (such as for example acetone, methanol, ethanol, butanol, ethylene glycol, formic acid and acetic acid) are used, mixed with water as the boiling means, sometimes capable of being in the presence of an acid or base catalyst. It is a process that has less of an environmental impact, since the system for recovering the waste is simpler and through distillation it is possible to recover the organic solvents, which is not as simple in conventional processes. In this process, the biomass reacts with organic solvents in the OH groups of the lignin, thus isolating the alcoholic lignin. The Organosolv process has not had great success in its industrial implementation, due to the increased working pressure required for extraction and also increased flammability, since the majority of the solvents used are very volatile.

The Kraft process is the most important industrial process for producing cellulosic pulps, since it represents approximately 90% of chemical pulp, which is characterized by being applicable to any type of wood and forest species. Another important factor is that the chemical products of the inorganic process can be recovered and reused efficiently. By means of the Kraft process, around 130 million tons of cellulose is produced per year around the world. However, the volume of the waste generated during the production of Kraft pulp is concerning for the environment, new uses and products based on the waste generated in the Kraft process being necessary, such as for example, the isolated Kraft lignin.

Therefore, due to all its features and due to its significant productive potential, the lignin would be a very suitable component for a preservative product for wood.

SUMMARY

The authors of the present disclosure have now found that modification of the lignin by means of borate or sodium nitrate and then with chromium (II) salts, copper (II), cadmium (II) or zinc (II), provides a protective effect against degradation agents of the wood and improves some properties of the same, such as the hygroscopicity and fire resistance.

Therefore, the present disclosure relates to a method for preparing a wood preservative composition, comprising modifying lignin with $Na_2B_4O_7$ or $NaNO_3$ and then with a chromium (II) salt, copper (II), cadmium (II) or zinc (II), for example, metal nitrates ($Cr(NO_3)_2$, $Cu(NO_3)_2$, $Cd(NO_3)_2$, $Zn(NO_3)_2$), to the preservative obtainable by means of this method; and to a method for preserving wood; and to the preserved wood according to the disclosure. The preservative of the disclosure prevents degradation by means of xylophagous and fungal agents, and also improves some properties of the wood, and the hygroscopicity and fire resistance.

DETAILED DESCRIPTION OF THE DRAWINGS

According to a first aspect, the present disclosure relates to a method for preparing a preservative composition for wood, which comprises the steps of:
a) mixing lignin and a solution of $Na_2B_4O_7$ or $NaNO_3$ while stirring;
b) adding, while stirring, a metallic salt containing a $M^{2+}$ ion, wherein M is an element selected from the groups 6, 11 or 12 of the periodic table of elements;
c) filtering the solid resulting in step c), which is a modified lignin;
d) suspending the modified lignin in water to obtain the preservative composition for wood.

The lignin used can be any obtained from different processes (Kraft and Organosolv) and preferably any commercially available.

The addition of $Na_2B_4O_7$ or $NaNO_3$ carried out in step a), modifies mainly the carboxylic and hydroxylic groups of the lignin, allowing the interaction of these $M^{2+}$ ions added in step b) with the molecule of the lignin. Group 6 of the periodic table of elements comprises, among others, the elements, chromium and molybdenum; Group 11 comprises copper, silver and gold; Group 12 comprises zinc and cadmium.

M is preferably selected from the group formed by chromium, copper, zinc and cadmium, the cation of the metallic salt being one of the group formed by Cr (II), Cu(II), Zn(II) and Cd(II).

Preferably, the anion of the metallic salt is selected from the group formed by $NO_3^{2-}$, for example, metal nitrates ($Cr(NO_3)_2$, $Cu(NO_3)_2$, $Cd(NO_3)_2$, $Zn(NO_3)_2$, or $Zn(NO_3)_2$).

Preferably, with the aim of obtaining a composition that is as homogeneous as possible, in step d) of the previous method, the water, in which the solid is suspended, contains a base, with the aim of providing a pH of between 7 and 13, and an acid is then added to ultimately obtain a pH of around 7.

Said base is preferably selected from the group formed by NaOH and KOH, although other bases known to the person skilled in the art could be used, and the acid preferably, although not limited to, is selected from the group formed by boric acid, acetic acid, sulfuric acid, and hydrochloric acid.

The final concentration of the modified lignin in the preservative composition can vary between 0.1 to 30% by weight, with respect to the total weight of the preservative solution. According to particular embodiments, the final concentration can be, for example, greater than 0.5%, or greater than 1%, or greater than 3%, or greater than 5%, or greater than 7.5%, or greater than 10%, and can be, for example, lower than 23% by weight, or lower than 21%, or lower than 19%, or lower than 18%, or lower than 16%, or lower than 15%. All the lower and greater values indicated are combinable with one another. Preferably, the range will be between 5 and 18%.

According to another aspect of the disclosure, the same relates to a preservative composition for wood based on modified lignin, obtained by means of the previously detailed process. Likewise, it relates to the preservative composition for wood based on modified lignin, obtainable by means of said method of the disclosure.

Another aspect of the disclosure relates to a composition containing lignin (CAS 9005-53-2), modified with $Na_2B_4O_7$ or $NaNO_3$ and $M^{2+}$ metal ions, such as defined previously. All the defined exemplary or preferred embodiments previously indicated are applicable to this composition.

According to an additional aspect, the present disclosure relates to a method for preserving wood, which comprises impregnating the wood to be preserved with the obtainable preservative composition or preservative composition obtainable according to the present disclosure.

The impregnation can be carried out using any impregnation method known in the prior art, for example, but not limited to, the Bethell or immersion process, methods commonly practiced in the timber industry, with a solution containing lignin modified according to the present disclosure.

Another aspect of the present disclosure is a preserved wood obtainable by means of the preservation process of the disclosure, using the preservative composition containing modified lignin, previously detailed. The wood to be preserved can be any type of wood, from hard woods to soft woods.

Hard woods are those which come from slow-growing trees, therefore, they are denser and naturally tolerate the weathering of time better than the soft woods, even though they have not received any preservative treatment. These woods generally come from deciduous trees, but can also be from evergreen trees, which take decades, even centuries, to reach the degree of maturity sufficient to be cut and can be used in the making of furniture or beams of large homes or single-family homes. They are much more expensive than the soft woods, due to the fact that their slow growth causes their scarcity, but it is much more attractive to construct furniture with them. Examples of trees considered to provide hard wood are, for example, beech, oak, walnut, maple, hornbeam, teak, lapacho, etc. Chestnut is often also categorized as hard wood due to its hardness. Although, the preservation of the hard woods is not as necessary, perhaps as in the soft woods, given its high price, it is advisable to also subject them to preservative treatments, with the aim of increasing their useful life even further.

Soft woods, in turn, encompass the wood of trees belonging to the order of coniferous and other quick-growing trees. The significant advantage they have with respect to hard woods, is their lightweight and their much lower price. Nevertheless, they do not have as long a life as the hard woods. Their manipulation is much easier, although it has the disadvantage of producing a greater quantity of chips. Some examples of soft woods that are widely used are: pine, elm, spruce, birch, poplar, cypress, balsa, etc. Chestnut is often also categorized as soft wood due to its flexibility.

The present disclosure is especially useful for preserving soft woods, improving its hardness and resistance, being able to maintain its affordable price, for example, widely used pine or spruce woods.

Specifically, the wood preserved according to the present disclosure has a loss of mass due to attack from the fungi *Trametes versicolour*, measured according to the ASTM D2017-94 standard, at least 75% lower than the loss of the same untreated wood, preferably at least 80% lower, more preferably at least 85% lower, and even more preferably at least 90% lower.

In the present specification, when reference is made to an ASTM standard, reference is made to *American Society for Testing and Materials. ASTM* D-1413 (2007): standard test method for wood preservatives by laboratory soil-block cultures. Philadelphia, 2007, 8p.

ASTM D-2017 (1994): Standard Method Of Accelerated Laboratory Test Of Natural Decay Resistance Of Wood. Annual Book of ASTM Standards, San Diego, v. 410, 1994, 4p.

ASTM D3165-07 (2014), Standard Test Method for Strength Properties of Adhesives in Shear by Tension Loading of Single-Lap-Joint Laminated Assemblies, Annual Book of ASTM Standards, San Diego, P A, 2014.3p.

Likewise, the wood preserved according to the present disclosure exhibits a Brinell hardness at least 40% greater than the same untreated wood, preferably at least 60% greater, more preferably at least 75% greater, and even more preferably at least 90% greater.

Furthermore, the wood preserved according to the present disclosure exhibits a loss of mass in the test of fire resistance from direct exposure lower by at least four percentage points than the same untreated wood, preferably by at least 5 percentage points.

Next, the present disclosure will be described in greater detail based on a series of examples; however, these examples should, in no way, be considered as limiting the scope of the disclosure, which is defined by the annexed claims.

EXAMPLES

Preparation of Preservative Compositions According to the Disclosure

Example 1: Preparation of a Preservative Composition Based on Lignin Modified with $NaNO_3$ and $Cu(NO_3)_2$ 5 g of lignin was added to 2 L of a solution containing 1.6998 g of $NaNO_3$ applying constant and vigorous stirring.

In a second step, 1.546 g of $Cu(NO_3)_2$ was added to the suspension containing lignin pre-modified with $NaNO_3$. Following 1 h under constant stirring, the solution was filtered through a 0.45 micron polyamide filter. The resulting solid, which is a lignin modified according to the present disclosure, is dried in a furnace at 50° C. for 24 h.

The lignin modified with copper obtained previously was used to prepare preservative compositions according to the present disclosure; for which purpose, said modified lignin was added, at different concentrations, which can vary from 0.1 to 30% by weight, to a solution of NaOH 0.1% with stirring for 5 minutes; Immediately after, an acid (sulfuric acid 3% or boric acid 6.8%) was added to obtain a pH of approximately 7 (approximately 100 milliliters), maintaining the stirring for 5 minutes; Lastly, the volume was completed up to 1 liter.

Example 2: Preparation of a Preservative Composition Based on Lignin Modified with $Na_2B_4O_7$ and $Cu(NO_3)_2$ 5 g of each sample of lignin was added to 2 L of a solution containing 4.024 g of $Na_2B_4O_7$ applying constant and vigorous stirring. Immediately after maintaining for 2 h at ambient temperature, the pH was adjusted to 7 by means of adding acid $H_2SO_4$ 98%, before adding the metal ions. 6.30 g of $Cu(NO_3)_2$ was added to the suspension containing the pre-modified lignin and the values of conductivity and pH were measured. Following 1 h under constant stirring, the solution was filtered through a 0.45 micron polyamide filter. The resulting solid, which is a lignin modified according to the present disclosure, was dried in a furnace at 50° C. for 24 h.

The lignin modified with the copper obtained previously was used to prepare preservative compositions according to the present disclosure; for which purpose, said modified lignin was added, at different concentrations, which can vary from 0.1 to 30% by weight, to a solution of NaOH 0.1% with stirring for 5 minutes; Immediately after, an acid (sulfuric acid 3% or boric acid 6.8%) was added to obtain a pH of approximately 7 (approximately 100 milliliters), maintaining the stirring for 5 minutes; Lastly, the volume was completed up to 1 liter.

Example 3: Preparation of a Preservative Composition Based on Lignin Modified with $NaNO_3$ and $Cd(NO_3)_3$ 5 g of lignin was added to 2 L of a solution containing 1.6998 g of $NaNO_3$ applying constant and vigorous stirring. In a second step, 0.987 g of $Cd(NO_3)_3$ was added to the suspension containing lignin pre-modified with $NaNO_3$.

Following 1 h under constant stirring, the same methods as in Example 1 were used. This modified lignin was used for the preparation of a preservative composition according to the disclosure.

Use of the Preservative Compositions According to the Disclosure in the Treatment of Wood

Example 4: Treatment of Wood with the Preservative Composition Obtained in Examples 1, 2 and 3

In this study, the efficacy of the use of the preservative composition of the present disclosure was verified, specifically, the composition obtained in the preceding Examples 1 and 3. Said efficacy was verified using 5 Pinus spp and Eucalyptus spp trees, obtained from a homogeneous population; the first bolt of the diameter at breast height (DBH, approximately 1.30 meters) was removed from all the trees, a piece from which the samples were dried for different analyses, and were placed in a climatic chamber at 20° C. and a relative humidity of 65%, with the aim of stabilizing the content of moisture balance.

Figure 1:
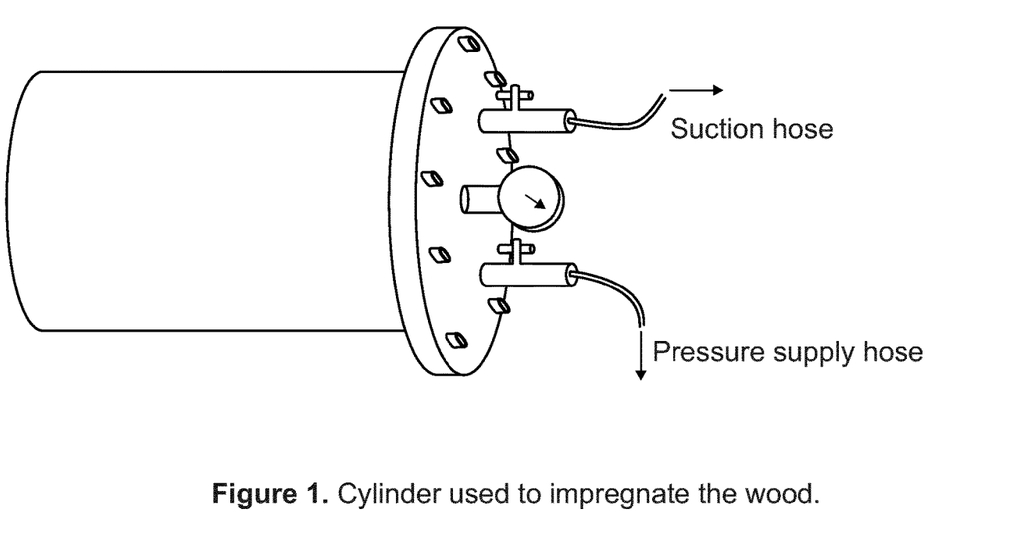
FIG. 1 shows a possible construction of the cylinder used for impregnating the wood.

The wood was treated with the preservative composition of the present disclosure according to the modified ASTM D-1413-07 standard. The treatment was carried out in a treatment cylinder and a vacuum pump (see FIG. 1) by means of a method similar to the Bethel treatment for wood posts. The samples were placed in the interior of the cylinder, an initial vacuum of 600 mm of Hg was applied for 30 min., under the vacuum the solution is released into the cylinder and afterwards, a pressure of 6 bar is applied for 60 min. A final vacuum of 30 min. is carried out to remove the excess solution from the specimens. Once the treatment is complete, the treated samples were removed and immediately after they were weighed to determine the absorption of the preservative composition, to determine the average of the retention capacity ($kg/m^3$) in each treatment. Lastly, the samples were placed in a climatic chamber at 20° C. and a relative humidity of 65%, with the aim of stabilizing the content of moisture balance, to carry out the subsequent analyses.

Evaluation of the Efficacy of the Preservative Compositions According to the Disclosure The characterization of the wood treated with the different preservative compositions prepared according to the present disclosure was carried out (Table 1). This characterization is very important for determining the efficacy of the compositions, and their possible uses. The fungicidal activity by the attack of fungi *Trametes versicolour* and *Ganoderma applanatum* was determined: the loss of mass, the chemical modification, the hygroscopicity, the specular gloss and the hardness.

TABLE 1

The different treatments with modified lignin applied in the wood.

| Treatment | Lignin pre-treatment | Preservative type |
|---|---|---|
| I | $NaNO_3$ | NT |
| II | $NaNO_3$ | $EOL_{Cu}$ |
| III | $NaNO_3$ | $EOL_{Cd}$ |
| IV | $NaNO_3$ | $EOL_{Zn}$ |
| V | $NaNO_3$ | $EKL_{Cu}$ |
| VI | $NaNO_3$ | $EKL_{Cd}$ |
| VII | $NaNO_3$ | $EKL_{Zn}$ |
| VIII | $NaNO_3$ | $EOL_{Cucrb}$ |
| IX | $NaNO_3$ | $EKL_{Cucrb}$ |

NT = untreated sample
$EOL_{Cu}$ = Organosolv lignin emulsion modified with copper,
$EOL_{Cd}$ = Organosolv lignin emulsion modified with cadmium,
$EOL_{Zn}$ = Organosolv lignin emulsion modified with zinc,
$EKL_{Cu}$ = Kraft lignin emulsion modified with copper,
$EKL_{Cd}$ = Kraft lignin emulsion modified with cadmium,
$EKL_{Zn}$ = Kraft lignin emulsion modified with zinc,
$EOL_{Cucrb}$ = Organosolv lignin emulsion modified with copper, chromium and boron and
$EKL_{Cucrb}$ = Kraft lignin emulsion modified with copper, chromium and boron.

Example 5: Loss of Mass by Attack of Fungi

The resistance of each one of the samples treated with preservative of the present disclosure was determined according to the ASTM D 2017-94 standard. The standard is used to evaluate the resistance of the wood products or other organic materials subject to disintegration by fungi which destroy the wood, such as *Trametes versicolour* and *Ganoderma applanatum*.

The results obtained are indicated in Table 2; the samples exhibiting the best result were treated with the treatment Ill (EOL$_{Cd}$) where the Organosolv lignin modified with cadmium was used, with a smaller percentage of weight loss when it is exposed to the fungus *Trametes versicolour* for a period of 48 weeks of exposure. These samples were classified according to the ASTM D2017-94 standard as long duration (very resistant). The untreated samples showed a greater loss of mass, being classified according to the ASTMD-2017-94 standard as moderately resistant (moderately resistant). All the treatments with compositions according to the present disclosure have had better results than the untreated samples, consequently, they are useful as a preservative of the wood, for increasing the resistance to the fungus *T. versicolour* and *G. applanatum*.

TABLE 2

Effect of different treatments with modified lignin in the loss of mass in samples exposed to the attack of fungi.

| Treatment | Fungus | Loss of mass (%) |
| --- | --- | --- |
| I | *Trametes versicolor* | 35.80(8.66)b |
| II | *Trametes versicolor* | 0.99(0.50)a |
| III | *Trametes versicolor* | 0.80(0.17)a |
| IV | *Trametes versicolor* | 3.08(2.25)a |
| V | *Trametes versicolor* | 3.20(2.91)a |
| VI | *Trametes versicolor* | 4.73(1.90)a |
| VII | *Trametes versicolor* | 1.64(0.24)a |
| VIII | *Ganoderma applanatum* | 18.05(7.7)a |
| IX | *Ganoderma applanatum* | 17.38(7.6)a |

The values between parentheses are the average values of standard deviation, in the same column, samples sharing different letters, are significantly different to the level of 5% in the Tukey test.

Example 6: Determination of the Hygroscopicity

Figure 2:
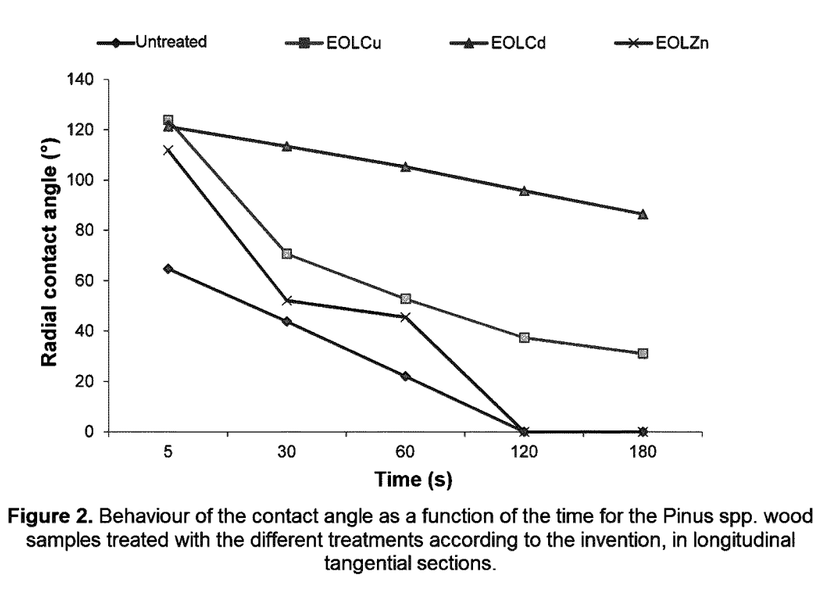
FIG. 2 shows a graph reflecting the behavior of the contact angle as a function of the time for the wood samples treated with the different treatments in longitudinal tangential sections.
Figure 3:
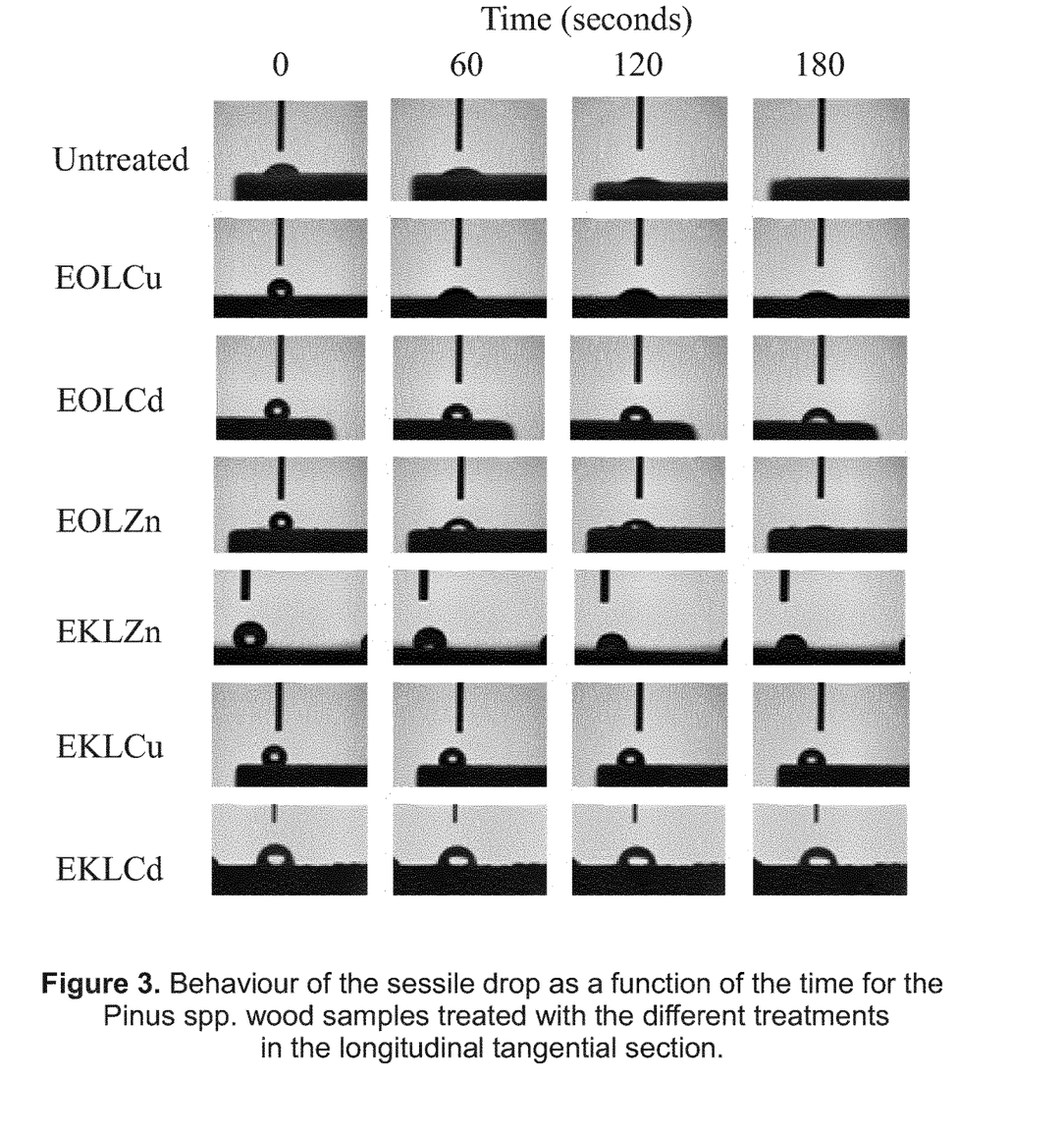
FIG. 3 shows a graph reflecting the behavior of the sessile drop as a function of time, for the wood samples of *Pinus* spp. treated with the different treatments in the longitudinal tangential section.

In FIG. 2, the results of the samples treated with the different treatments with preservative of the present disclosure are shown. It is possible to observe that in all the treatments there was an improvement in the hygroscopicity of the wood, becoming increasingly more hydrophobic, in comparison to the untreated wood. The efficiency of chemical preservatives is mainly due to their hygroscopicity, because the reduction of the moisture content of the wood inhibits the growth of fungi. The treatment that showed the best results was the wood treated with the treatment III (EOLcd), showing average values of 86.56° at the angle of the sessile drop after 180 seconds of exposure, being a value greater than the average of the untreated wood) (64.74°, in the values after the exposure the sessile drop (initial moment), as can be seen in FIG. 3.

Example 7: Determination of the Brinell Hardness

Figure 4:
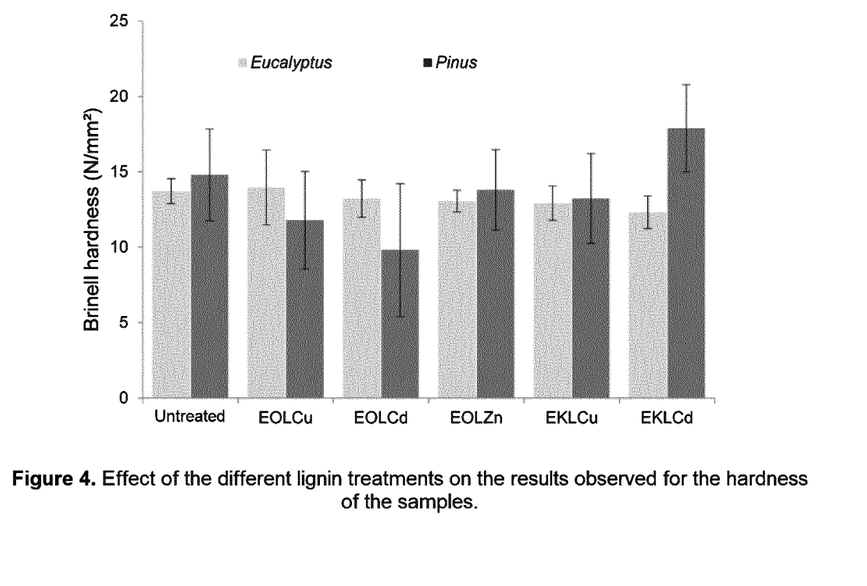
FIG. 4 shows a graph reflecting the effect of different lignin treatments in the results observed for the hardness of the samples.

The (Brinell) hardness was greater with treatments with preservative of the present disclosure in comparison to the untreated wood; wood treated with the treatment IV (EOL$_{Zn}$) for the *Pinus* species showed an increase of around 98% in the Brinell hardness in comparison to the untreated wood. The results demonstrate a reduction in the hardness of the treatments III (EOL$_{Cd}$) and VI (EKL$_{Cd}$) for the *Pinus* species, in comparison to the other treatments carried out, but the lowest average hardness values for the different treatments showed an increase of 41% in comparison to the untreated wood, as can be seen in FIG. 4. It is known that the hardness has various influences such as the density of the wood, but it is possible to observe in this study that the treatment with lignin modified with metals influenced the variation of hardness in the samples of both species.

For the *Pinus* sp., species the treatment EKL$_{Cd}$ exhibited the maximum values for the Brinell hardness. However, the samples of *Eucalyptus* sp. wood subjected to the same treatment exhibited lower hardness values. The results demonstrate that the treatments with EOL$_{Cu}$ and EOL$_{Cd}$ reduced the hardness of the wood of the *Pinus* sp., species.

Example 8: Determination of the Adhesion Resistance

Figure 5:
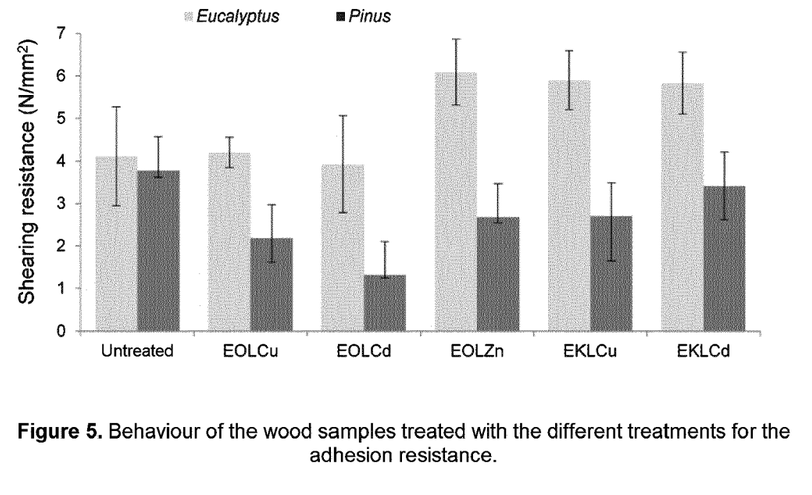
FIG. 5 shows a graph reflecting the behavior of the wood samples treated with the different treatments for adhesion resistance.

In this study, the different treatments according to the disclosure studied in the process of adhesion resistance of the wood were evaluated (FIG. 5).

The average values of the shearing resistance of the *Eucalyptus* spp wood were increased with the treatments according to the disclosure, with the exception of the treatment III (EOL$_{Cd}$), which exhibited a shear strength reduction of 4.5% with respect to the untreated wood. This fact can be explained by the reduced hygroscopicity of the wood, which, with the treatment, became more hydrophobic. This meant that the penetrability of the adhesive was reduced, but still exhibits results in compliance with the ASTM D-3165-07 standard, ABNT 790, which stipulates that the preservative products for the wood must guarantee durability and biological protection, without affecting the adhesion of the adhesive.

ABNT is an abbreviation for Brazilian Association of Technical Standards. NBR 16202: Postes de eucalipto preservedo para redes de distribuição. Rio de Janeiro, 2013. 65 p.

The results of the shearing resistance of the woods treated according to the disclosure (FIG. 5) in comparison to the untreated wood, revealed that the *Pinus* spp wood had the worst behavior with respect to the treatment.

Example 9: Fire Resistance for Short Periods

Figure 6:
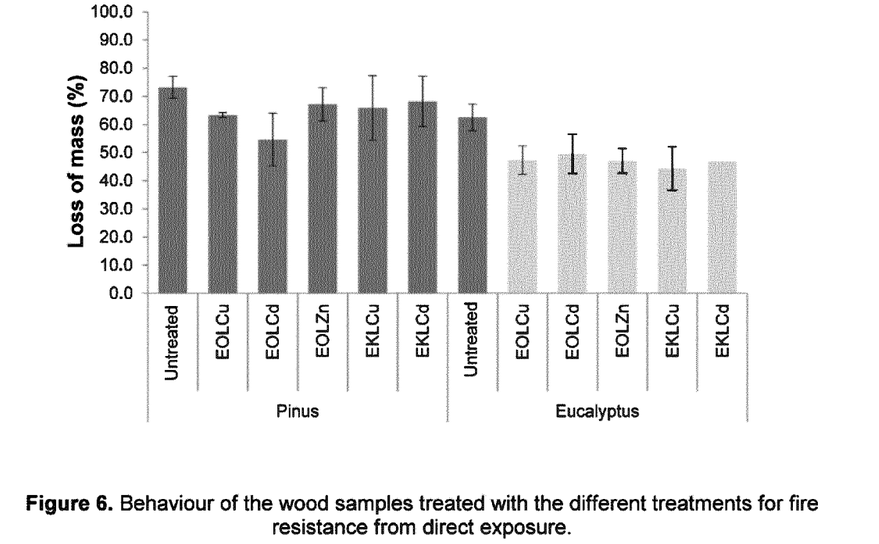
FIG. 6 shows a graph reflecting the behavior of loss of mass in the wood samples treated with the different treatments for fire resistance from direct exposure.

This study evaluated the different treatments with the preservative of the present disclosure in exposure of the wood in contact with direct flame for two minutes; next, in the absence of fire, it was observed how long the loss of mass and the ignition, flame and ember times lasted. All the treatments carried out with the preservatives of the present disclosure, caused a reduction in the loss of mass with respect to the untreated wood for both species (FIG. 6), with the exception of the EKL treatment, which exhibited the same value as the untreated *Pinus* spp wood.

Figure 7:
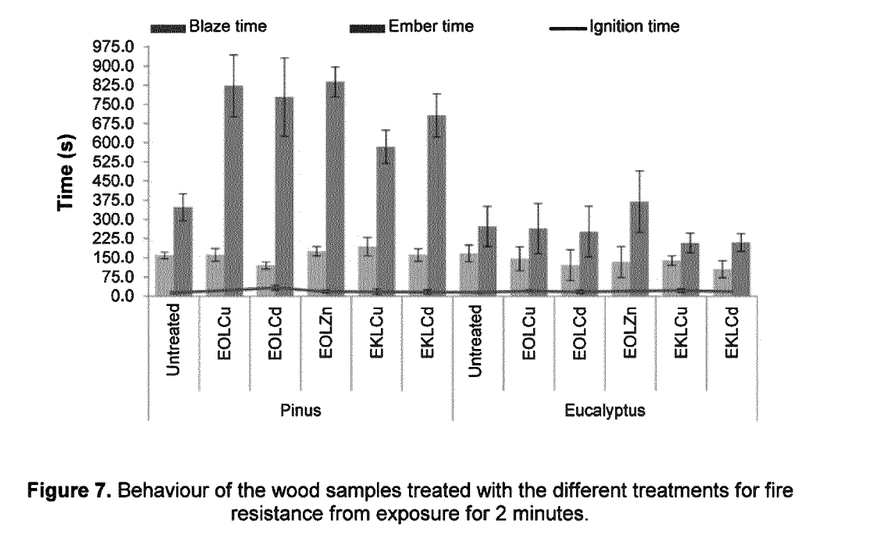
FIG. 7 shows a graph reflecting the behavior of the wood samples treated with the different treatments for fire resistance from direct exposure for 2 minutes.

In FIG. 7, it is possible to observe that the treatment III (EOL$_{Cd}$) was maintained for a shorter time in flames and embers; in all the other treatments, the samples exhibited longer times than the untreated sample. FIG. 7 shows that the treatment with EOL$_{Cd}$ exhibited the longest ignition time for *Pinus* spp., with 32.8 seconds, which represents an increase of 144% in relation to the untreated samples.

It is also observed in FIG. 7 that the ember time is shorter in the woods of the *Eucalyptus* species than in those of the *Pinus* species. In the *Eucalyptus* wood, only the EOL$_{Zn}$ treatment exhibited longer ember time in comparison to the untreated wood. For *Eucalyptus* spp., none of the evaluated treatments exhibited a reduction to the ember time compared with the untreated woods. This fact means that the treatment makes it difficult for the fire to penetrate the surface of the wood, reaching its interior; for this reason, the reduction of the loss of mass (FIG. 6) of the samples occurred due to exposure to fire.

The results demonstrated that the treatments exhibit a very interesting behaviour in contact with the flame, which demonstrates the efficiency of the different preservative compositions of the present disclosure as a fire retardant.

Example 10: Color Test

Aesthetics has gained importance in recent years and wood is an attractive material, depending on its design, its color and its surface. It is also necessary to take into account the external appearance of the wood, since it may end up being one of the most important criteria when deciding to buy. With the aim of quantitatively evaluating the change in the color of the pine samples treated with different preservatives according to the present disclosure, the color of the wood was measured with the CIE L*a*b* system (Hunter, Richard Sewall. "Photoelectric Color-Difference Meter". JOSA. 38 (7): 661, 1948). The woods treated according to the present disclosure also exhibit improvements in terms of the color obtained (Table 3). The treatments IV ($EOL_{Zn}$) and V (EKLcu) resulted in darker final products with a reduction in the average values of (L*), which indicates the luminosity of the wood. In general, the darker color is more attractive and competitive, since the appearance of the wood of the present disclosure comes close to that of some noble woods. The coordinate (a*) in the woods treated according to the disclosure exhibits a range of 7 to 9.00, with respect to the untreated wood of 3.6, that is to say, they exhibit an intensification of the color in the direction to red with the different treatments carried out. The average values of the variation of the color (EΔ*) are between 9.39 and 26.52, exhibiting a very significant variation. This is due to the color of the emulsion, black-brown, which produced the variation of the initial color of the samples visible to the human eye. The tonality angle)(H° reduced in all the treatments of the disclosure.

destroyed after 405 days of exposure. Only 3 untreated samples in the entire experiment exhibited some attack by termites, both moderately attacked, being samples obtained at different times (225, 360 and 405 days) of exposure.

The *Pinus* spp samples treated with preservative according to the present disclosure were moderately attacked by fungi after 315 days of exposure, but with no occurrence of attack by termites, with the exception of the treatment with $EOL_{Zn}$, which was moderately attacked by fungi after 315 days of exposure.

The untreated *Eucalyptus* spp samples were intensively attacked by fungi. Regarding the samples with $EOL_{Cu}$ and $EOL_{Zn}$ treatments, they were moderately attacked, without any occurrence of attack by termites for 405 days of exposure.

Example 12: Accelerated Weathering Chamber

In this step, the *Pinus* sp. samples treated with preservative according to the present disclosure were evaluated, of three different compositions, specifically, the Kraft and Organosolv lignin emulsions modified with chromium, copper and boron ($EKL_{Cucrb}$ and $EOL_{Cucrb}$). All the experiments were compared with the untreated wood.

Figure 9:
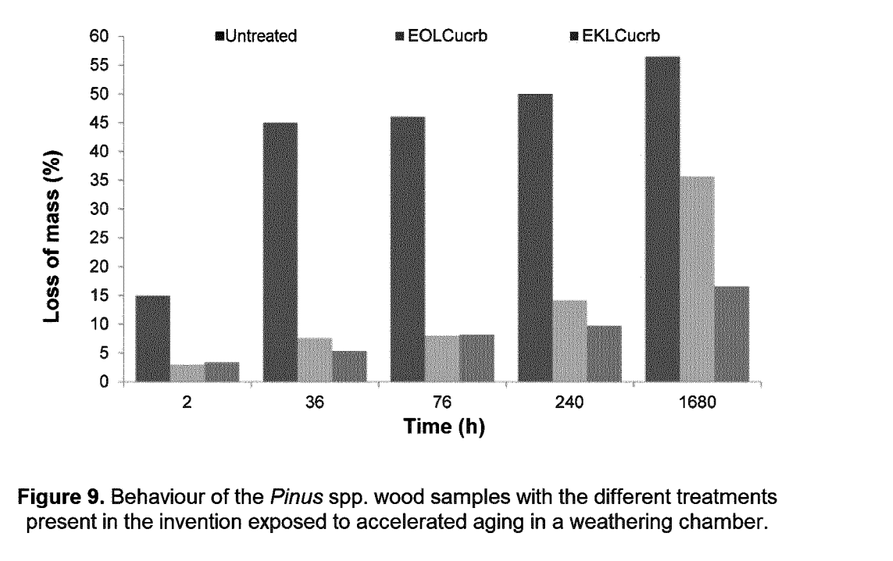
FIG. 9 shows a graph reflecting the behavior of the wood samples of *Pinus* spp. with the different treatments according to the disclosure, exposed to accelerated aging in a weathering chamber.

In FIG. 9, it is possible to observe the degradation of the *Pinus* sp. samples, exposed to accelerated aging in a weathering chamber for a period of 1680 hours of exposure, where the untreated samples exhibited cracks throughout the exposure. All the treatments exhibited darker coloration than the untreated wood. The untreated wood exhibited greater loss, of 70.6%, than the wood treated with $EKL_{Cucrb}$, $EKL_{Cucrb}$, which demonstrates the efficiency of the treatment for 1680 hours of direct exposure to ultraviolet rays. The other treatments exhibited results of loss of mass lower than the untreated wood.

Example 13: Retention of the Preservative According to the Present Disclosure

The volumetric analysis was used to calculate the retention of the preservatives according to the present disclosure

TABLE 3

Effect of the different position on color parameters on the surface of the samples of different treatments examined.

| Treatment | L* | a* | b* | C | H° | ΔE* |
|---|---|---|---|---|---|---|
| I | 82.41 (2.8)d | 3.60 (0.8)a | 21.60 (1.2)a | 21.91 (1.23)ab | 80.57 (1.99)c | — |
| II | 74.91 (1.68)c | 8.27 (1.15)bc | 24.78 (0.30)ab | 26.14 (0.44)cd | 71.58 (2.41)b | 9.39 |
| III | 69.44 (3.08)bc | 8.66 (1.15)bc | 25.55 (2.45)abc | 27.00 (2.75)d | 71.39 (2.38)b | 14.47 |
| IV | 56.68 (8.76)a | 7.21 (0.95)b | 19.73 (3.19)bcd | 21.03 (3.16)a | 69.72 (2.84)ab | 26.05 |
| V | 56.45 (9.41)a | 9.00 (0.54)c | 22.07 (2.87)bcd | 23.86 (2.67)abc | 67.57 (2.84)a | 13.03 |
| VI | 70.08 (2.60)bc | 7.59 (1.24)bc | 22.91 (0.99)cd | 24.15 (1.28)bcd | 71.76 (2.25)b | 16.18 |

The values between parentheses are the average values of standard deviation, in the same column samples sharing different letters are significantly different to the level of 5% in the Tukey test.

Example 11: Natural Aging in Degradation Field

Figure 8:
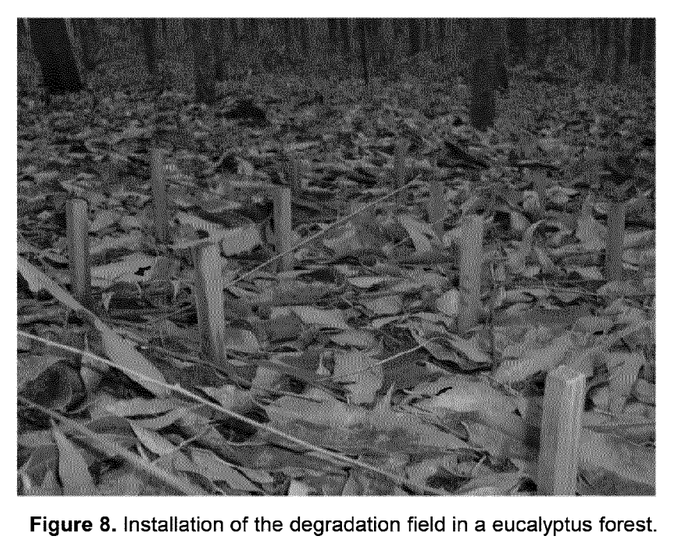
FIG. 8 shows the installation site of the degradation field in a *eucalyptus* forest.
Figure 10:
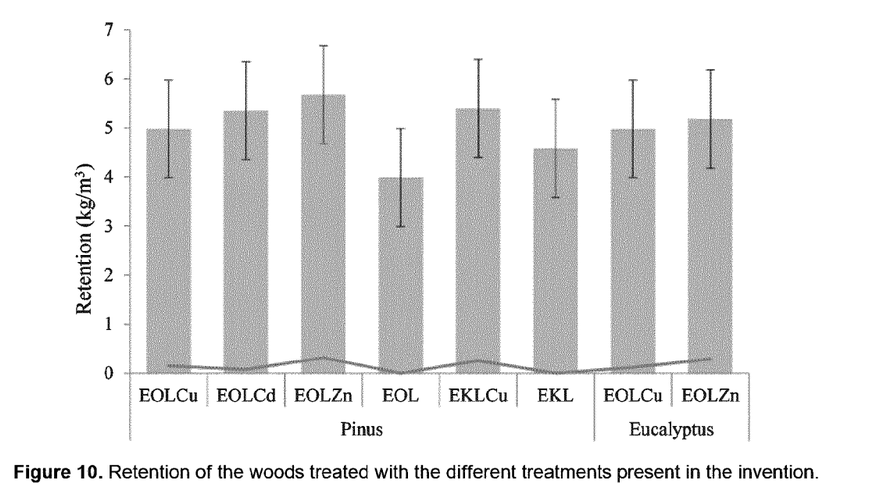
FIG. 10 shows a graph reflecting the retention of the wood samples treated with the different treatments present in the disclosure.

The field test is indispensable and represents a vital point in the use potential evaluation of a new preservative. In order to evaluate the behavior of the samples treated with preservative emulsions of the present disclosure the wood in contact with the degradation field for 405 days of exposure (FIG. 8) in a *Eucalyptus* forest, the occurrence of fungal and termite attacks was evaluated visually, determining the rate of healing of the samples. A significant degradation of the samples of untreated *Pinus* spp wood was observed at the end of the 405 days of exposure, being classified as intensively attacked by fungi after 315 days of exposure, and in the wood samples (*Pinus* and *Eucalyptus*), by quantitative method. Using the atomic absorption spectroscopy (AAS) results, the percentages of active ingredient (metal) in the preservatives of the present disclosure, which was used to treat the wood, were calculated. They are the following: EOLCu, 0.24% of Cu; EOLZn, 0.55% of Zn, EOLCd, 0.15% of Cd, EKLCd, 0.28% of Cd, KLCu, 0.47% of Cu and, lastly, KLZn, 1.12% of Zn. FIG. 10 represents the retention of the preservatives of the present disclosure. It is observed that the samples with greatest retentions are those treated with Zn and were those which exhibited the greatest concentration of metal. According to the NBR 16202 standard (ABNT, 2013), retention is a quantitative parameter, it is considered the most important factor to evaluate the quality of a preservative treatment and refers to the quantity of toxic product retained in a given volume of wood expressed in kg/m$^3$. In the *Pinus* sp. species treated with EOLZn, an average retention of 5.68 kg/m$^3$ of emulsion was achieved (FIG. 10). For the *Eucalyptus* sp. species treated with EOLZn, an average retention of 5.2 kg/m$^3$ was achieved. The recommended retention for the *Eucalyptus* posts is approximately 5 kg/m$^3$ NBR 16202 (ABNT, 2013).

The invention claimed is:

1. A method for preparing a preservative composition for wood, the method includes the steps of:
    a) mixing lignin and a solution of $Na_2B_4O_7$ or $NaNO_3$ while stirring;
    b) adding, while stirring, a metallic salt containing a $M^{2+}$ ion, wherein M is an element selected from groups 6, 11, and 12 of the periodic table of elements;
    c) filtering the resulting solid, which is a modified lignin; and
    d) suspending the modified lignin in water to obtain the preservative composition for wood.

2. The method according to claim 1, wherein M is selected from the group formed by chromium, copper, zinc, and cadmium.

3. The method according to claim 1, wherein the anion of the metallic salt is $NO_3^{2-}$.

4. The method according to claim 1, wherein in step d) the water, in which the solid is suspended, contains a base with the aim of having a pH of between 7 and 13, and an acid is then added to obtain a pH of around 7.

5. The method according to claim 4, wherein the base is selected from the group formed by NaOH and KOH.

6. The method according to claim 4, wherein the acid is selected from the group formed by sulfuric acid, boric acid, acetic acid, and hydrochloric acid.

7. The method according to claim 1, wherein the quantity of modified lignin is between 0.1 and 30% by weight with respect to the total weight of the preservative composition.

8. The method according to claim 1, wherein the metallic salt is selected from the group consisting of $Cr(NO_3)_2$, $Cu(NO_3)_2$, $Cd(NO_3)_2$, and $Zn(NO_3)_2$.

* * * * *